US008971910B2

(12) United States Patent
Morrin

(10) Patent No.: US 8,971,910 B2
(45) Date of Patent: Mar. 3, 2015

(54) NETWORK ELEMENT, CELLULAR COMMUNICATION SYSTEM AND METHOD THEREFOR

(75) Inventor: Michael Eric Morrin, Royston Hertfordsire (GB)

(73) Assignee: ip.access Limited, Cambourne, Cambridge (GB)

( * ) Notice: Subject to any disclaimer, the term of this patent is extended or adjusted under 35 U.S.C. 154(b) by 205 days.

(21) Appl. No.: 13/703,595

(22) PCT Filed: Jun. 2, 2011

(86) PCT No.: PCT/EP2011/059169
§ 371 (c)(1),
(2), (4) Date: Jan. 16, 2013

(87) PCT Pub. No.: WO2011/157570
PCT Pub. Date: Dec. 22, 2011

(65) Prior Publication Data
US 2013/0210444 A1    Aug. 15, 2013

(30) Foreign Application Priority Data

Jun. 15, 2010  (GB) .................................. 1009972.9

(51) Int. Cl.
*H04W 72/00* (2009.01)
*H04M 1/66* (2006.01)
(Continued)

(52) U.S. Cl.
CPC .............. *H04W 40/04* (2013.01); *H04W 48/06* (2013.01)
USPC .......................................... 455/453; 455/411

(58) Field of Classification Search
CPC ..... H04W 48/02; H04W 48/12; H04W 48/06; H04W 48/08; H04W 48/14; H04W 48/10; H04W 48/20
USPC ......................................... 455/450–453, 455
See application file for complete search history.

(56) References Cited

U.S. PATENT DOCUMENTS

2003/0195003 A1* 10/2003 Cao et al. ...................... 455/438
2008/0102853 A1   5/2008 Kagimoto et al.
(Continued)

FOREIGN PATENT DOCUMENTS

EP    1475984 A1    11/2004
WO    0143451 A2    6/2001
(Continued)

OTHER PUBLICATIONS

International Search Report and Written Opinion for PCT/EP2011/059169 issued Sep. 6, 2011.
(Continued)

*Primary Examiner* — George Eng
*Assistant Examiner* — Nam Huynh
(74) *Attorney, Agent, or Firm* — Fitch Even Tabin & Flannery LLP

(57) ABSTRACT

A network element for supporting communication within at least one cell of a cellular communication network comprises a signal processing module arranged to identify when a first cell supported by the network element is in a capacity state, and in response thereto, indicate the first cell as being in a restricted access state within system information broadcast within the first cell and valid for wireless communication units in a connected mode state. The signal processing module is further arranged, upon receipt of a connection request message from a wireless communication unit within the first cell, to determine whether the first cell is in a capacity state, and, in response to determining that the first cell is in a capacity state, to cause the wireless communication unit from which the connection request message was received to enter a connected mode state.

12 Claims, 4 Drawing Sheets

(51) Int. Cl.
*H04W 40/04* (2009.01)
*H04W 48/06* (2009.01)

(56) References Cited

U.S. PATENT DOCUMENTS

2008/0200146 A1* 8/2008 Wang et al. .................. 455/410
2010/0159928 A1* 6/2010 Wu ............................ 455/435.2

FOREIGN PATENT DOCUMENTS

WO  2006137779 A1  12/2006
WO  2009064932 A2   5/2009

OTHER PUBLICATIONS

Great Britain Search Report for GB1009972.9 dated Oct. 14, 2010 (5 pages).

"3rd Generation Partnership Project: Technical Specification Group Services and System Aspects; Access Class Barring and Overload Protection; (Release 6)", 3GPP Draft; TR 23.898 V 2.0.0 Marked, 3rd Generation Partnership Project (3GPP) Mobile Competence Centre; 650, Route Des Lucioles; F-06921 Sophia-Antipolis Cedex; France, vol. CN WG1, Feb. 21, 2005 XP050402727, p. 11, paragraph 5.1, p. 13, paragraph 6.1, p. 14-p. 15, paragraph 6.1.2; figure 6.2.

"3rd Generation Partnership Project: Technical Specification Group Radio Access Network; User Equipment (UE) procedures in idle mode and procedures for cell reselection in connected mode", 3GPP TS 25.304 version 7.8.0 Release 7 "Cell Reservations and Access Restrictions (cells not operating in MBSFN mode)" section 5.3.

M Li et al.; IEEE international Conference on Communications Technology and Applications; 2009; IEEE; pp. 106-109 "Access probability aware cell reselection for load balancing".

* cited by examiner

NETWORK ELEMENT, CELLULAR COMMUNICATION SYSTEM AND METHOD THEREFOR

CROSS REFERENCE TO RELATED APPLICATIONS

This application is a national phase application of International Application No. PCT/EP2011/059169, filed Jun. 2, 2011, claiming priority to European Application No. 1009972.9, filed Jun. 15, 2010, which is incorporated by reference herein in its entirety.

FIELD OF THE INVENTION

The field of the invention relates to a network element, a cellular communication system and method therefor. The invention is applicable to, but not limited to, a network element for supporting communication within at least one cell of a cellular communication system, and a method for redirecting a wireless communication unit therefor.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

Lower power (and therefore smaller coverage area) femto cells (or pico-cells) are a recent development within the field of wireless cellular communication systems. Femto cells or pico-cells (with the term femto cells being used hereafter to encompass pico-cells or similar) are effectively communication coverage areas supported by low power base stations (otherwise referred to as Access Points (APs)). These femto cells are intended to be able to be piggy-backed onto the more widely used macro-cellular network and support communications to UEs in a restricted, for example 'in-building', environment.

Typical applications for such femto APs include, by way of example, residential and commercial (e.g. office) locations, communication 'hotspots', etc., whereby an AP can be connected to a core network via, for example, the Internet using a broadband connection or the like. In this manner, femto cells can be provided in a simple, scalable deployment in specific in-building locations where, for example, network congestion at the macro-cell level may be problematic.

Under certain conditions, for example when a cell becomes fully loaded with on-going communications that it is able to support (i.e. when the number of active connections with UEs for that cell reaches a maximum supported number), it may be necessary or desirable to redirect UEs attempting to connect to that cell to an alternative cell. Within a typical UMTS™ network, UEs attempt to connect to a cell by initiating a Radio Resource Control (RRC) Connection procedure. Specifically, a UE sends an RRC Connection Request message to the RNS supporting the cell to which it is trying to connect. If the UE is to be allowed to establish a connection, the RNS transmits an RRC Connection Setup message back to the UE comprising connection settings, etc. for the UE. Upon receipt of the RRC Connection Setup message, the UE applies the connection settings specified in the RRC Connection Setup message, and sends an RRC Connection Complete message back to the RNS to confirm that the settings have been applied. However, if, say, the cell through which the UE is attempting to connect is fully loaded and a connection cannot be established with the UE, it may be desirable/necessary to redirect UEs from which RRC Connection Request messages are received to alternative cells.

In the 3GPP™ UMTS™ technical specifications, and in particular 3GPP TS 25.331 of the UMTS technical specifications, an RNS is able to specify within an RRC Connection Reject message (i.e. a message rejecting the RRC Connection Request from a UE) an alternative frequency, within a "frequency info" Information Element (IE) of the RRC Connection Reject message, or an alternative Radio Access Technology (RAT), within an "inter-RAT info" IE of the RRC Connection Reject message, that the requesting UE should switch to. In this manner, for network configurations where there are known to be suitable alternative cells that are 'Inter-Frequency' (i.e. cells arranged to use different carrier frequencies to that of the current cell) or 'Inter-RAT' (i.e. cells arranged to use different radio access technologies to that of the current cell), the RNS is able to redirect a UE that is attempting to connect thereto, to an alternative carrier frequency and/or an alternative radio access technology, and thereby to an alternative cell. For example, the RNS may know of alternate cells from OAM configuration, from measurements made by receivers connected to the RNS or from measurements received from the UE.

However, a problem with this approach is that it is only applicable where there are known to be (at least to the RNS that is supporting the cell to which the UE is attempting to connect) suitable alternative Inter-Frequency or Inter-RAT cells. For example, for network configurations where there are only alternative Intra-Frequency cells (i.e. cells arranged to use the same carrier frequency and same RAT as the current cell), the RRC Connection Reject message defined in the 3GPP technical specifications does not provide a mechanism for redirecting a UE to such an alternative Intra-Frequency cell. Accordingly, upon receipt of an RRC Connection Reject message, a UE will simply re-attempt to establish a connection with the same cell, transmitting another RRC Connection Request message to the RNS. As a result, the UE will fail to establish a connection until, say, the cell to which it is attempting to connect becomes less busy and a connection therewith becomes possible, potentially resulting in a poor user experience, or another non-fully loaded cell becomes more favourable (for example due to the UE moving from one cell coverage area to another).

An alternative mechanism available within the 3GPP technical specifications for causing UEs to be redirected to alternative cells is to mark the current cell as being 'barred' within a System Information Block 3 (SIB3) that is broadcast within a system information message to all UEs within that cell. In this manner, UEs will not even attempt to establish a connection with the barred cell. However, a problem with this method is that the SIB3 broadcast message of a cell is read by, and valid for, all UEs in idle mode (i.e. including those UEs not involved with any active RRC connections) camped within that cell. Accordingly, upon marking the cell as being 'barred' within the SIB3 for that cell, all UEs in idle mode camped within that cell will simultaneously move to alternative cells, thereby potentially resulting in a large amount of unnecessary simultaneous signalling overhead for those other cells. The barred state of the cell will also prevent any new calls etc. being established on that cell, and may lead to a following period of under utilisation of the cell.

Thus, a need exists for an improved method and apparatus for redirecting wireless communication units, particularly when a communication cell is fully loaded.

SUMMARY OF THE INVENTION

Accordingly, the invention seeks to mitigate, alleviate or eliminate one or more of the above mentioned disadvantages singly or in any combination. Aspects of the invention provide a network element, a cellular communication system, and a method therefor as described in the appended claims.

According to a first aspect of the invention, there is provided a network element for supporting communication within at least one cell of a cellular communication network. The network element comprises a signal processing module arranged to identify when a first cell supported by the network element is in a capacity state, and in response thereto indicate the first cell as being in a restricted access state within system information broadcast within the first cell and valid for wireless communication units in a connected mode state. The signal processing module is further arranged, upon receipt of a connection request message from a wireless communication unit within the first cell, to determine whether the first cell is in a capacity state, and in response to determining that the first cell is in a capacity state, to cause the wireless communication unit from which the connection request message was received to enter a connected mode state.

Thus, in one example embodiment of the invention, when a wireless communication unit attempts to establish a connection within a cell that is in or approaching a full capacity state, for example when a number of active connections with wireless communication units for that cell reaches a maximum supported number, the wireless communication unit is caused to enter a 'connected-mode' state. Once in this 'connected-mode' state, the system information in which the cell is indicated as being in a restricted access state becomes valid for the wireless communication unit. As a result, the wireless communication unit will identify the cell as being in a restricted access state, and will attempt to move to an alternative cell. Thus, wireless communication units attempting to establish a connection with a cell in a capacity state may be redirected to an alternative cell. In particular, it will be appreciated that a network element adapted in accordance with the inventive concept is not required to have knowledge of suitable alternative cells in order to redirect a wireless communication unit attempting to establish a connection therewith, and the problem of a wireless communication unit retrying to establish a connection with the same cell may be substantially alleviated.

According to an optional feature of the invention, upon identifying that the first cell is in a capacity state, the signal processing module may be arranged to indicate the first cell as being in a restricted access state within system information valid for wireless communication units in a connected mode state, said system information being invalid for wireless communication units in an idle state. Optionally, upon identifying that the first cell supported by the network element is in a capacity state, the signal processing module may be arranged to indicate the first cell as being in a restricted access state within a first system information block broadcast within the first cell and valid for wireless communication units in a 'connected-mode' state, and indicate the first cell as not being in a restricted access state within a second system information block broadcast within the first cell and valid for wireless communication units in an 'idle' state.

In this manner, UEs camped on that cell but in an idle mode (i.e. not involved with any active connections) will not identify the cell as being in a restricted access (for example a cell-barred) state, and will not be redirected to alternative cells. Accordingly, indicating the cell as being in a restricted access state within system information invalid for UEs in an idle state in this manner, substantially alleviates the potential problem of UEs in an idle mode camped within that cell simultaneously moving to alternative cells, thereby substantially avoiding the potential for a large amount of unnecessary and simultaneous signalling overhead for those alternative cells.

According to an optional feature of the invention, upon identifying that the first cell is in a capacity state, the signal processing module may be arranged to set one of a "Cell Barred" information element and a "Cell Reserved" information element within a system information block valid for wireless communication units in a connected mode state.

According to an optional feature of the invention, upon identifying that the first cell is in a capacity state, the signal processing module may be arranged to indicate the first cell as being in a restricted access state within system information broadcast within the first cell and valid for wireless communication units in a "no dedicated channel" connected mode state, and upon receipt of a connection request message from a wireless communication unit within the first cell, and if it is determined that the first cell is in a capacity state, the signal processing module may be arranged to cause the wireless communication unit to enter a "no dedicated channel" connection state. For example, the network element may be arranged to support communication within at least one cell of a Universal Mobile Telecommunications System (UMTS™) network, and upon identifying that a first cell supported by the network element is in a capacity state, the signal processing module may be arranged to indicate the first cell as being in a restricted access state within system information broadcast within the first cell and valid for wireless communication units in, say, a Cell_FACH state. Upon receipt of a connection request message from a wireless communication unit within the first cell, and if it is determined that the first cell is in a capacity state, the signal processing module may be arranged to cause the wireless communication unit to enter the Cell_FACH state. For example, the signal processing module may be arranged to set one of a "Cell Barred" information element and a "Cell Reserved" information element within a system information block type 4 (SIB4) broadcast within said cell.

In this manner, UEs in a "dedicated channel" connected mode state, for example UEs with active connections on a dedicated channel (for example in a CELL_DCH state for a UTMS system) will not identify the cell as being in a restricted access state, and will not be redirected to alternative cells. Accordingly, indicating the cell as being in a restricted access state within system information valid only for UEs in a "no dedicated channel" connection state, in this manner, may minimise disruption to UEs with existing active dedicated channel connections.

According to an optional feature of the invention, upon receipt of a connection request message from a wireless communication unit within the first cell, and if it is determined that the first cell is in a capacity state, the signal processing module may be arranged to send a connection setup message to the wireless communication unit from which the connection request message was received. In one example, the connection setup message may be arranged to cause the wireless communication unit to enter a connected mode state where the wireless communication unit recognises the restricted mode of the first cell and selects another cell.

According to an optional feature of the invention, upon receipt of a connection request message from a wireless communication unit within the first cell, and if it is determined that the first cell is in a capacity state, the signal processing module may be arranged to determine a type of redirection to use from a selection of intra-frequency redirection, inter-frequency redirection, and inter-RAT (Radio Access Technology) redirection. If the signal processing module determines that intra-frequency redirection is to be used, the signal processing module may then be arranged to cause the wireless communication unit to enter a connected mode state.

According to a second aspect of the invention, there is provided a cellular communication system comprising at least one network element for supporting communication within at least one cell of the communication system. The network element comprises a signal processing module arranged to identify when a first cell supported by the network element is in a capacity state, and in response thereto indicate the first cell as being in a restricted access state within system information broadcast within the first cell and valid for wireless communication units in a connected mode state. The signal processing module is further arranged, upon receipt of a connection request message from a wireless communication unit within the first cell, to determine whether the first cell is in a capacity state, and in response to determining that the first cell is in a capacity state, to cause the wireless communication unit from which the connection request message was received to enter a connected mode state.

According to a third aspect of the invention, there is provided a method for redirecting a wireless communication unit within a cellular communication network. The method comprises, at a network element, identifying when a first cell supported by the network element is in a capacity state, and in response thereto indicating said cell as being in a restricted access state within system information broadcast within the first cell and valid for wireless communication units in a connected mode state. The method further comprising, upon receipt of a connection request message from a wireless communication unit within the first cell, determining whether the first cell is in a capacity state, and in response to determining that the first cell is in a capacity state, causing the wireless communication unit from which the connection request message was received to enter a connected mode state.

According to a fourth aspect of the invention, there is provided a tangible computer program product comprising executable program code for redirecting a wireless communication unit within a cellular communication network. The executable program code is operable for, at a network element, identifying when a first cell supported by the network element is in a capacity state, and in response thereto indicating the first cell as being in a restricted access state within system information broadcast within the first cell and valid for wireless communication units in a connected mode state. The executable program code is further operable for, upon receipt of a connection request message from a wireless communication unit within the first cell, determining whether the first cell is in a capacity state, and in response to determining that the first cell is in a capacity state, causing the wireless communication unit from which the connection request message was received to enter a connected mode state.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Figure 1:
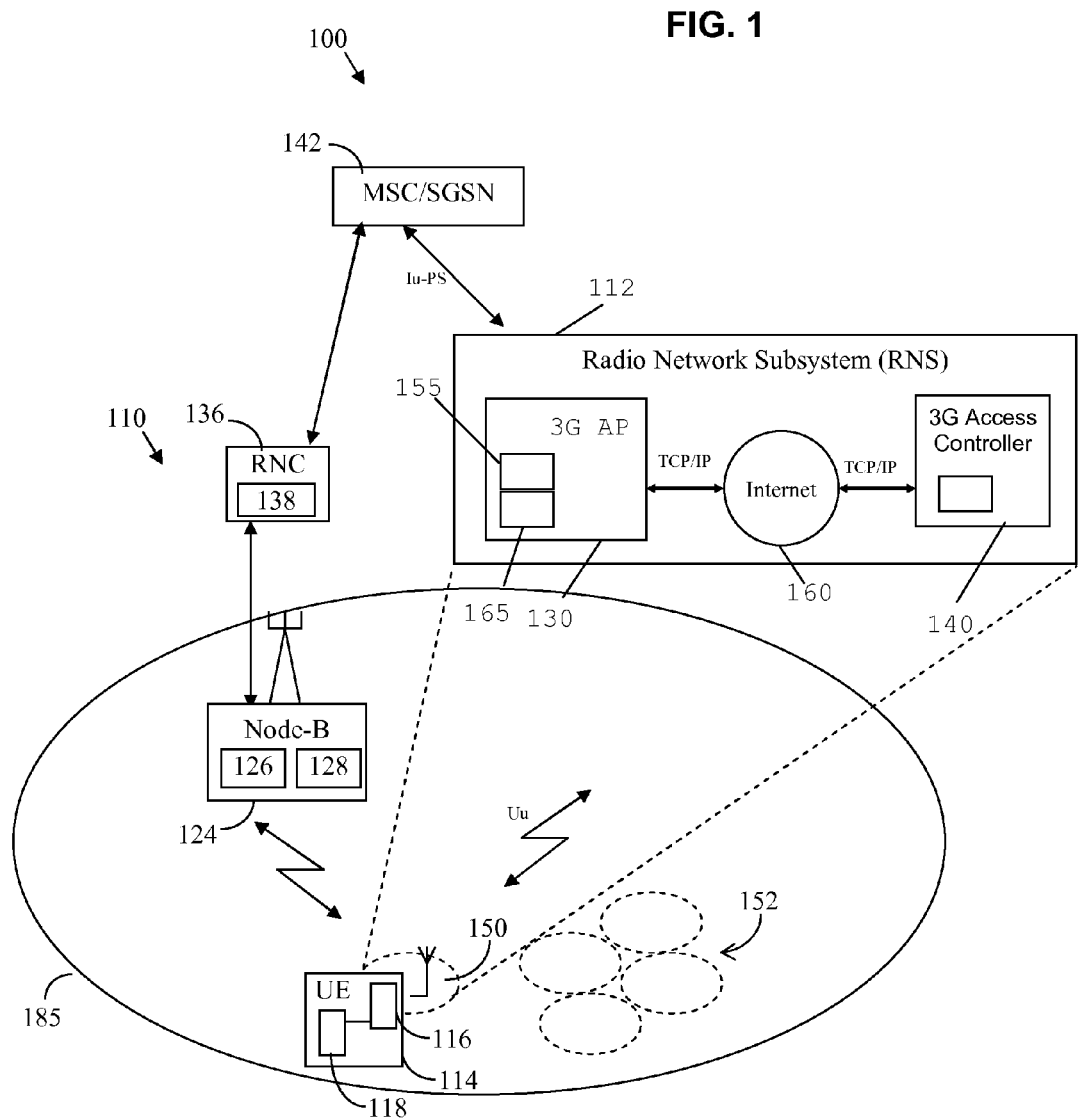
FIG. 1 illustrates an example of part of a cellular communication system, adapted in accordance with an example embodiment.

Examples of the invention will be described in terms of a 3rd generation (3G) Radio Network Sub-system (RNS) for supporting a cell within a Universal Mobile Telecommunications System (UMTS™) cellular communication network. However, it will be appreciated by a skilled artisan that the inventive concept herein described may be embodied in any type of network element for supporting communication within a cellular communication network. In particular, it is contemplated that the inventive concept is not limited to being implemented within a network element for supporting one or more cells within a UMTS™ cellular communication network, but may be equally be applied within one or more network element(s) adapted in accordance with alternative cellular communication technologies.

In a number of applications, the adaptation of a network element in accordance with examples of the invention may effectively perform a method for redirecting a wireless communication unit within a cellular communication network. The method comprises identifying when a first cell supported by the network element is in a capacity state, and in response thereto indicating the first cell as being in a restricted access state within system information broadcast within the first cell and valid for wireless communication units in a connected mode state. The method further comprises, upon receipt of a connection request message from a wireless communication unit within the first cell, determining whether the first cell is in a capacity state, and in response to determining that the first cell is in a capacity state, causing the wireless communication unit from which the connection request message was received to enter a connected mode state.

In this manner, when a wireless communication unit attempts to establish a connection within a cell that is in or approaching a full capacity state, for example when a number of active connections with wireless communication units for that cell approaches or reaches a maximum supported number, the wireless communication unit is caused to enter a connected mode state. It will be appreciated that the term 'capacity state' used herein is intended to encompass a state where a cell has reached a full capacity state (e.g. when the number of active connections with wireless communication units for that cell has reached a maximum supported number) as well as a state where a cell is approaching a full capacity state (e.g. when the number of active connections with wireless communication units for that cell is approaching a maximum supported number, for example when the number of active connections exceeds, say, 80% of the maximum supported number, or when a power budget or backhaul link capacity threshold is approached or exceeded). Once in a connected mode state where the system information in which the cell is indicated as being in a restricted access state becomes valid for the wireless communication unit, the wireless communication unit will identify the cell as being in a restricted access state, and will attempt to move to an alternative cell. A restricted mode state may comprise any state in which a wireless communication unit may attempt to move to an alternative cell. For example, such a restricted access state may comprise the cell being in a 'Cell Barred' state, a 'Cell Reserved' state, etc. Thus, wireless communication units attempting to establish a connection with a cell in a capacity state may be redirected to an alternative cell. In particular, it will be appreciated that a network element adapted in accordance with the inventive concept is not required to have knowledge of suitable alternative cells in order to redirect a wireless communication unit attempting to establish a connection therewith, and the problem of a wireless communication unit retrying to establish a connection with the same cell may be substantially alleviated.

Referring now to the drawings, and in particular FIG. 1, an example of part of a cellular communication system, adapted in accordance with an example embodiment of the invention, is illustrated and indicated generally at 100. In FIG. 1, there is illustrated an example of a communication system in a form of a 3GPP™ UMTS™ network 100 that comprises a combination of a macro cell 185 and a plurality of femto cells 150, 152 in accordance with one example embodiment of the invention. For the example embodiment illustrated in FIG. 1, radio network sub-systems (RNSs) comprise two distinct architectures to handle the respective macro cell and femto cell communications.

In the macro cell scenario, the RNS 110 comprises a controller in a form of a Radio Network Controller (RNC) 136 having, inter alia, one or more signal processing module(s) 138. The RNC 136 is operably coupled to at least one NodeB 124 for supporting communications within the macro cell 185. The NodeB 124 comprises signal processing module 126 and transceiver circuitry 128 arranged to enable communication with one or more wireless communication units located within the general vicinity of the macro communication cell 185, such as User Equipment (UE) 114. The RNC 136 is further operably coupled to a core network element 142, such as a serving general packet radio system (GPRS) support node (SGSN)/mobile switching centre (MSC), as known.

In a femto cell scenario, an RNS 112 comprises an Access Point (AP) 130 that is arranged to perform a number of functions generally associated with a cellular communication base station, and a controller in a form of an Access controller (3G AC) 140. As will be appreciated by a skilled artisan, an Access Point is a communication element that supports communications within a communication cell, such as a femto cell 150, and as such provides access to a cellular communication network via the femto cell 150. One envisaged application is that an AP 130 may be purchased by a member of the public and installed in their home. The AP 130 may then be connected to an AC 140 over, say, the owner's broadband internet connection 160.

Thus, an AP 130 may be considered as encompassing a scalable, multi-channel, two-way communication device that may be provided within, say, residential and commercial (e.g. office) locations, communication 'hotspots' etc., to extend or improve upon network coverage within those locations. An example of a typical 3G AP for use within a 3GPP™ system may comprise some NodeB functionality and some aspects of radio network controller (RNC) 136 functionality. For the illustrated example embodiment, the AP 130 comprises signal processing module 165 and transceiver circuitry 155 arranged to enable communication with one or more wireless communication units located within the general vicinity of the femto communication cell 150, such as User Equipment (UE) 114, via a wireless interface (Uu).

The 3G Access Controller 140 may be coupled to the core network (CN) 142 via an Iu interface, as shown. In this manner, the AP 130 is able to provide voice and data services to a cellular handset, such as UE 114, in a femto cell, in the same way as a conventional NodeB would in a macro cell, but with the deployment simplicity of, for example, a Wireless Local Area Network (WLAN) access point.

The example cellular communication system 100 illustrated in FIG. 1, may comprise one or more network elements for supporting communication within one or more cells of the communication system 100. The one or more network elements each comprise a signal processing module arranged to identify when the respective cell(s) supported thereby is(are) in a capacity state, and upon identifying that the respective cell(s) is(are) in a capacity state, to indicate that(those) cell(s) as being in a restricted access state within system information broadcast therein and valid for UEs in a connected mode state.

For example, a UMTS™ network utilises a Radio Resource Control (RRC) protocol. The RRC protocol is defined in the Universal Mobile Telecommunications System (UMTS™) Radio Resource Control (RRC) Protocol specification (3GPP™ TS 25.331), and forms part of the network layer between the UE and the UMTS Terrestrial Radio Access Network (UTRAN). The RRC protocol comprises connection management procedures, which, in turn, comprise the broadcasting of system information by the UTRAN. More particularly, system information is broadcast within system information blocks, which typically group together system information elements of the same nature. A system information message may be used to convey the system information blocks on a Broadcast Control CHannel (BCCH) logical channel, which, in turn, may be mapped onto either a Broadcast CHannel (BCH) or Forward Access CHannel (FACH) transport channel. The size of a system information message may be configured to fit the size of a BCH or FACH transport block, as required.

Accordingly, a signal processing module of a network element adapted in accordance with example embodiments of the present invention may be arranged to generate system information blocks to be broadcast within system information messages of cells supported thereby. If a system information block is larger than a size of a system information message, the signal processing module may be arranged to segment the system information block and transmit it within several messages. In contrast, if the encoded system information block is smaller than a system information message, several system information blocks may be concatenated into the same system information message.

Thus, and in accordance with some example embodiments, the signal processing module of a network element may be arranged, upon identifying that a cell supported by the network element is in a capacity state, to indicate said cell as being in a restricted access state within a system information block broadcast within a system information message for said cell. As will be appreciated by a skilled artisan, by broadcasting the indication that a cell is in a restricted access state within an RRC system information message, only slight modifications are required to be made to network elements and UEs supporting 3GPP communication in order to implement the example embodiments of the invention.

The signal processing module of a network element may be further arranged, upon receipt of a connection request message, for example such as an RRC Connection Request message in case of a UMTS™ system, from a UE within a cell supported thereby (referred to herein as a first cell or subject cell), to determine whether the subject cell is in a capacity state, and if it is determined that the subject cell is in a capacity state, to cause the UE from which the connection request message was received to enter a connected mode state. As previously mentioned, in this manner, upon entering a connected mode state, the UE will identify the subject cell as being in a restricted access state, and will attempt to move to an alternative cell.

For example, a powered up UE may be capable of operating within a plurality of operational modes such as, by way of example, an idle mode and a connected mode, each mode comprising one or more states between which the UE is capable of transitioning. For example, the UMTS™ technical specifications define an idle mode whereby a UE in idle mode is said to be 'camped' on a cell, but with no active connections. The UMTS™ technical specifications further define a connected mode, whereby a UE in connected mode may be in one of a plurality of connected mode states, such as CELL_DCH, CELL_FACH, CELL-PCH, and, URA_PCH. Accordingly, a UE within a UMTS network implementing example embodiments of the present invention may be caused to move from idle mode to one of the connected mode states, for example a CELL_FACH state.

The signal processing module may be arranged to cause the UE from which the connection request message was received to enter a connected mode state by sending one or more connection setup messages, for example in a form of one or more RRC Connection Setup messages, to the wireless communication unit. The connection setup message(s) may comprise setup information including, by way of example, suitable radio bearer configuration and a RRC State Indicator for Cell FACH, to cause the UE to enter a connected mode state.

In accordance with some example embodiments of the present invention, upon identifying that a cell supported by the network element is in a capacity state, a signal processing module of a network element may be arranged to indicate that cell as being in a restricted access state within system information valid for UEs in a connected mode state, but invalid for UEs in an idle state. In this manner, UEs camped on that cell but in an idle mode (i.e. not involved with any active connections) will not identify the cell as being in a restricted access state, and will not be redirected to alternative cells. Accordingly, indicating the cell as being in a restricted access state within system information that is invalid for UEs in an idle state in this manner, substantially alleviates the problem of UEs in an idle mode camped within that cell simultaneously moving to alternative cells, which would otherwise potentially result in a large amount of unnecessary simultaneous signalling overhead for those alternative cells.

Advantageously, upon identifying that a cell is subsequently no longer in a capacity state, the signal processing module may indicate the cell as being not in a restricted access state within the system information block broadcast within that cell and valid for UEs in a connected mode state. In this manner, when the cell is no longer in a capacity state, normal operation for that cell may be resumed, in particular with regard to UEs in a connected mode state.

In a further example, the signal processing module of a network element may be arranged, upon identifying that a cell supported by the network element is in a capacity state, to indicate said cell as being in a restricted access state within a first system information block broadcast within said cell and valid for UEs in a connected mode state. For example, the signal processing module may be arranged to indicate a cell as being in a restricted access state by setting, say, a "Cell Barred" information element or a "Cell Reserved" information element within the first system information block. The setting of such a "Cell Barred" information element or a "Cell Reserved" information element may be achieved by simply including such an information element within the first system information block. Alternatively the setting of such a "Cell Barred" information element or a "Cell Reserved" information element may comprise setting a 'TRUE' value in a field of the "Cell Barred" information element or a "Cell Reserved" information element within the first system information block.

The signal processing module may be further arranged, upon identifying that a cell supported by the network element is in a capacity state, to indicate said cell as not being in a restricted access state within a second system information block broadcast within said cell and valid for UEs in an idle state. Such an indication may comprise the omission of, say, a "Cell Barred" information element or a "Cell Reserved" information element within the second system information block. Alternatively, such an indication may comprise setting a 'FALSE' value in a field of a "Cell Barred" information element or a "Cell Reserved" information element within the second system information block.

In accordance with some example embodiments, a signal processing module of a network element may be arranged, upon identifying that a cell supported by the network element is in a capacity state, to indicate that cell as being in a restricted access state within system information valid for UEs in a "no dedicated channel" connected mode state, such as a CELL_FACH state within a UMTS™ system, whereby no dedicated channel is allocated to the UE. Such a "no dedicated channel" connected mode state is in contrast to a "dedicated channel" connected mode state, such as a CELL_DCH state within a UMTS™ system, whereby a dedicated physical (uplink and/or downlink) channel is allocated to the UE. Accordingly, upon receipt of a connection request message from a UE within a cell supported by the network element (that is the subject cell), and if it is determined that the subject is in a capacity state, the signal processing module may be arranged to cause the wireless communication unit to enter a "no dedicated channel" connection state, such as a CELL_FACH state in the case of a UMTS™ system. In this manner, UEs in a "dedicated channel" connected mode state, for example UEs with active connections on a dedicated channel (for example in a CELL_DCH state for a UTMS™ system) will not identify the cell as being in a restricted access state, and will not be redirected to alternative cells. Accordingly, indicating the cell as being in a restricted access state within system information valid only for UEs in a "no dedicated channel" connection state in this manner may minimise disruption to UEs with existing active dedicated channel connections.

As previously mentioned, within a UMTS™ system, system information is broadcast within system information blocks. As defined in the technical specifications, a system information block type 3 (SIB3) is typically only valid for wireless communication units in idle mode. Conversely, a system information block type 4 (SIB4) is typically only valid for UEs in a connected mode state, and specifically for UEs within one of the "non-dedicated channel" connected mode states, namely CELL_FACH, CELL_PCH, and, URA_PCH states. Accordingly, a signal processing module of a network element adapted in accordance with example embodiments of the present invention may be arranged, upon identifying that a cell supported by the network element is in a capacity state, to set, say, a "Cell Barred" information element within a system information block type 4 (SIB4) broadcast within that cell.

It is contemplated that a signal processing module of a network element adapted in accordance with some example embodiments may be arranged to implement other forms of UE redirection, and to select which method of redirection to use in order to provide, say, an appropriate level of service. For example, in the 3GPP™ UMTS™ technical specifications, and in particular 3GPP TS 25.331 of the UMTS™ technical specifications, an RNS is able to specify within an RRC Connection Reject message (i.e. a message rejecting the RRC Connection Request from a UE) an alternative frequency, within a "frequency info" Information Element (IE) of the RRC Connection Reject message, or an alternative Radio Access Technology (RAT), within an "inter-RAT info" IE of the RRC Connection Reject message, that the requesting UE should switch to. In this manner, for network configurations where there are known to be suitable alternative cells that are 'Inter-Frequency' (i.e. cells arranged to use different carrier frequencies to that of the current cell) or 'Inter-RAT' (i.e. cells arranged to use different radio access technologies to that of the current cell), the RNS is able to redirect a UE attempting to connect thereto to an alternative carrier frequency and/or an alternative radio access technology, and thereby to an alternative cell.

The system information broadcast from a cell may instruct a UE to append certain measurement results of neighbouring cells to an RRC Connection request Message, and these results may indicate a presence of cells on the same or other frequencies, which may preferentially be used for redirection of the UE. The presence of such measurement results, and/or other information elements such as Establishment Cause measurements made directly by a network element, and OAM configuration information, may be used to determine an appropriate redirection mechanism for a particular RRC Connection Request.

Thus, a signal processing module of a network element adapted in accordance with some example embodiments of the present invention may be arranged, upon receipt of a connection request message from a UE within a cell supported by the network element (that is the subject cell), and if it is determined that the subject cell is in a capacity state, to determine an appropriate type of UE redirection to use. For example, the signal processing module may be arranged to select a type of redirection to use from a selection of:

(i) Intra-frequency redirection, where if selected the signal processing module is arranged to send a Connection Setup message to the UE comprising one or more settings arranged to cause the UE to enter a connected mode state;

(ii) Inter-frequency redirection, where if selected the signal processing module is arranged to send a Connection Reject message comprising a "frequency info" information element to the UE; and (iii) Inter-RAT redirection, where if selected the signal processing module is arranged to send a Connection Reject message comprising an "inter-RAT info" information element to the UE.

It is further contemplated that, under certain conditions, it may be desirable/required to accept a connection request, even when the cell has been identified as being in a capacity state. For example, an RRC Connection Request comprising an establishment cause "Emergency Call" may be allowed to proceed with the network element triggering some other action such as modifying, handing-out or dropping the service provided to another UE, or an RRC Connection Request may arrive shortly after the termination of another RRC connection (i.e the cell now has some spare capacity), but before the cell has moved from a restricted capacity state to a normal connection processing state. Accordingly, the signal processing module of the network element may be further arranged, upon receipt of a connection request message from a UE within a cell supported by the network element (that is the subject cell), and if it is determined that the subject cell is in a capacity state, to determine whether to accept the connection request. If it is determined to accept the connection request, the signal processing module may cause the UE from which the connection request was received, to enter, say, a "dedicated channel" connected mode state (e.g. a CELL_DCH state within a UMTS system). In this manner, where the signal processing module has indicated the subject cell as being in a restricted access state within system information valid for UEs in a "no dedicated channel" connected mode state (e.g. a CELL_FACH state, CELL_PCH state or a URA_PCH state within a UMTS™ system), the UE from which the connection request was received will not identify the subject cell as being in a restricted access state, and will not be redirected to alternative cells.

It is envisaged that the inventive concept herein described may be implemented within one or more radio network controllers of a cellular communication network, such as the RNC 136 within the macro RNS 110 or the femto AC 140 within the femto RNS 112 of FIG. 1. However, it is also envisaged that the present invention is not limited to being implemented within such controllers, and may be implemented within other appropriate network elements within a cellular communication system. For example, the present invention may be implemented within a base transceiver station, such as the NodeB 124 or femto AP 130 of FIG. 1, where, say, appropriate radio resource control functionality is provided at a lower level within the network structure. Alternatively, the present invention may be implemented within a core network element, such as the MSC/SGSN 142 illustrated in FIG. 1, where, say, appropriate radio resource control functionality is provided at a higher level within the network structure.

Figure 2:
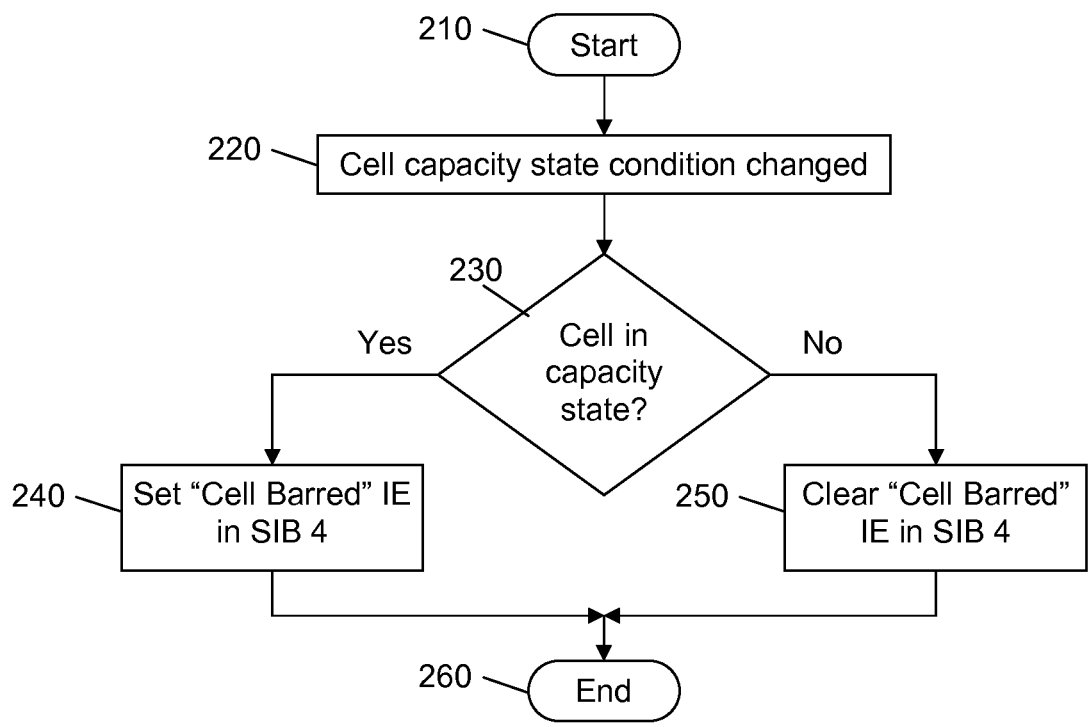
FIGS. 2 and 3 illustrate simplified flowcharts of an example method for redirecting a wireless communication unit within a cellular communication network.
Figure 3:
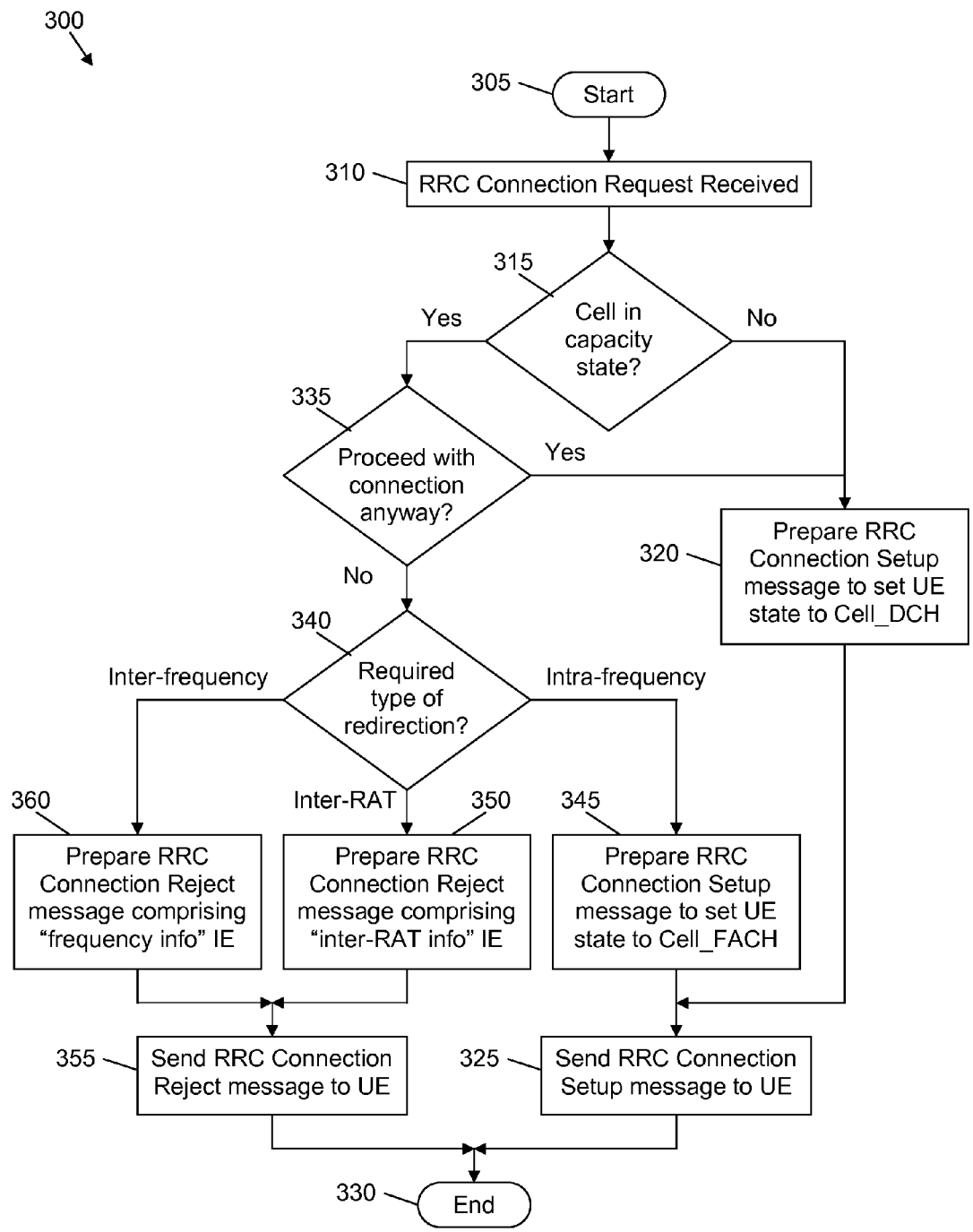

Referring now to FIGS. 2 and 3, there are illustrated simplified flowcharts 200, 300 of a method for redirecting a wireless communication unit within a cellular communication network, for example as may be implemented within a network element of a cellular communication system. In summary, the method comprises, within a network element, identifying when a cell supported by the network element is in a capacity state. Upon identifying that a cell supported by the network element is in a capacity state, the method further comprises indicating said cell as being in a restricted access state within system information broadcast within said cell and valid for wireless communication units in a connected state. The method further comprises, upon receipt of a connection request message from a wireless communication unit supported by the network element (that is the subject cell), determining whether the subject cell is in a capacity state, and if it is determined that the subject cell is in a capacity state, causing the wireless communication unit from which the connection request message was received to enter a connected mode state.

In greater detail, a part of the example method illustrated in FIG. 2 starts at step 210, and moves on to step 220 where the capacity state condition of a cell changes. For example the cell may change from a non-capacity state (where a number of active connections with UEs for that cell is less than a maximum supported number) to a capacity state (where a number of active connections with UEs for that cell reaches or approaches a maximum supported number) or vice versa. The method then moves to step 230 where it is determined whether or not, following the capacity state condition change, the cell is in a capacity state. If the cell is in a capacity state, the method moves to step 240 where the cell is indicated as being in a restricted access state within system information that is broadcast within said cell and valid for wireless communication units in a connected mode state. For the illustrated example, this may comprise setting a "Cell Barred" information element within a system information block type 4 (SIB4) for the cell. The part of the method illustrated in FIG. 2 then ends at step 260. Conversely, if the cell is not in a capacity state, the method moves to step 250 where the cell is indicated as not being in a restricted access state within system information broadcast within said cell and valid for wireless communication units in a connected mode state. For the illustrated example, this may comprise clearing a "Cell Barred" information element within a SIB4 for the cell. The part of the method illustrated in FIG. 2 then ends at step 260.

A second part of the example method illustrated in FIG. 3 starts at step 305, and moves to step 310 where a connection request is received from a UE within a cell that is supported by the network element (the subject cell). Next, in step 315, it is determined as to whether or not the subject cell is in a capacity state. If it is determined that the subject cell is not in a capacity state, the method moves to step 320, where for the illustrated example, a connection setup message is prepared to set the UE state to a dedicated channel connection state (CELL_DCH state). The connection setup message is then sent to the UE at step 325, and the method ends at step 330.

Referring back to step 315, if it is determined that the subject cell is in a capacity state, the method moves on to step 335, where it is determined whether or not to accept the connection request and to proceed with establishing a connection. If it is determined that the connection request should be accepted, despite the subject cell being in a capacity state, the method moves to step 320, where a connection setup message is prepared to set the UE state to a dedicated channel connection state (CELL_DCH state), and the connection setup message is then sent to the UE at step 325. The method then ends at step 330.

Conversely, if it is decided not to accept the connection request at step 335 and to redirect the UE, the method moves on to step 340 where an appropriate type of redirection is determined. If it is determined that the appropriate type of redirection is intra-frequency redirection, the method moves on to step 345, where a connection setup message is prepared to set the UE state to a non-dedicated channel connection state (CELL_FACH state). The method then moves on to step 325 where the connection setup message is sent to the UE, and the method ends at step 330.

Conversely, if it is determined that the appropriate type of redirection is inter-RAT redirection at step 340, the method moves on to step 350 where a connection reject message is prepared comprising an "inter-RAT info" information element. The method then moves on to step 355 where the connection reject message is sent to the UE, and the method ends at step 330.

Finally, if it is determined that the appropriate type of redirection is inter-frequency redirection at step 340, the method moves on to step 360 where a connection reject message is prepared comprising a "frequency info" information element. The method then moves on to step 355 where the connection reject message is sent to the UE, and the method ends at step 330.

As mentioned, it is also envisaged that the inventive concept can be implemented within any appropriate network element adapted to support one or more cells within a cellular communication system, such as a radio network controller or femto access controller within a UMTS™ network. Although examples of the invention have been described with reference to a UMTS™ network, it is envisaged that, for alternative applications, the inventive concept may be applied to cellular communication networks implementing alternative cellular communication technologies.

In some examples, some or all of the steps illustrated in the flowcharts of FIGS. 2 and 3 may be implemented in hardware and/or some or all of the steps illustrated in the flowcharts may be implemented in software.

Thus, the hereinbefore examples provide a radio access apparatus for use in cellular communication systems. In particular, the hereinbefore examples of apparatus and methods are capable of intra-frequency redirection of wireless communication units. In one example, a solution is described, whereby a signal processing module of a network element is arranged to identify when a cell supported by the network element is in a capacity state, and upon identifying that a cell supported by the network element is in a capacity state, indicate said cell as being in a restricted access state within system information broadcast within the said cell and valid for wireless communication units in a connected mode state. The signal processing module is further arranged, upon receipt of a connection request message from a wireless communication unit within a cell supported by the network element (subject cell), to determine whether or not the subject cell is in a capacity state. If it is determined that the subject cell is in a capacity state, the signal processing module causes the wireless communication unit from which the connection request message was received to enter a connected mode state. Advantageously, for example embodiments of the present invention, when a wireless communication unit attempts to establish a connection within a cell that is in a capacity state, the wireless communication unit is caused to enter a connected mode state. Once in this connected mode state, the system information in which the cell is indicated as being in a restricted access state becomes valid for the wireless communication unit. As a result, the wireless communication unit will identify the cell as being in a restricted access state, and will attempt to move to an alternative cell. Thus, wireless communication units attempting to establish a connection with a cell in a capacity state may be redirected to an alternative cell. In particular, it will be appreciated that a network element adapted in accordance with the inventive concept is not required to have knowledge of suitable alternative cells in order to redirect a wireless communication unit attempting to establish a connection therewith. Thus, the problem of a wireless communication unit retrying to establish a connection with the same cell may be substantially alleviated.

Figure 4:
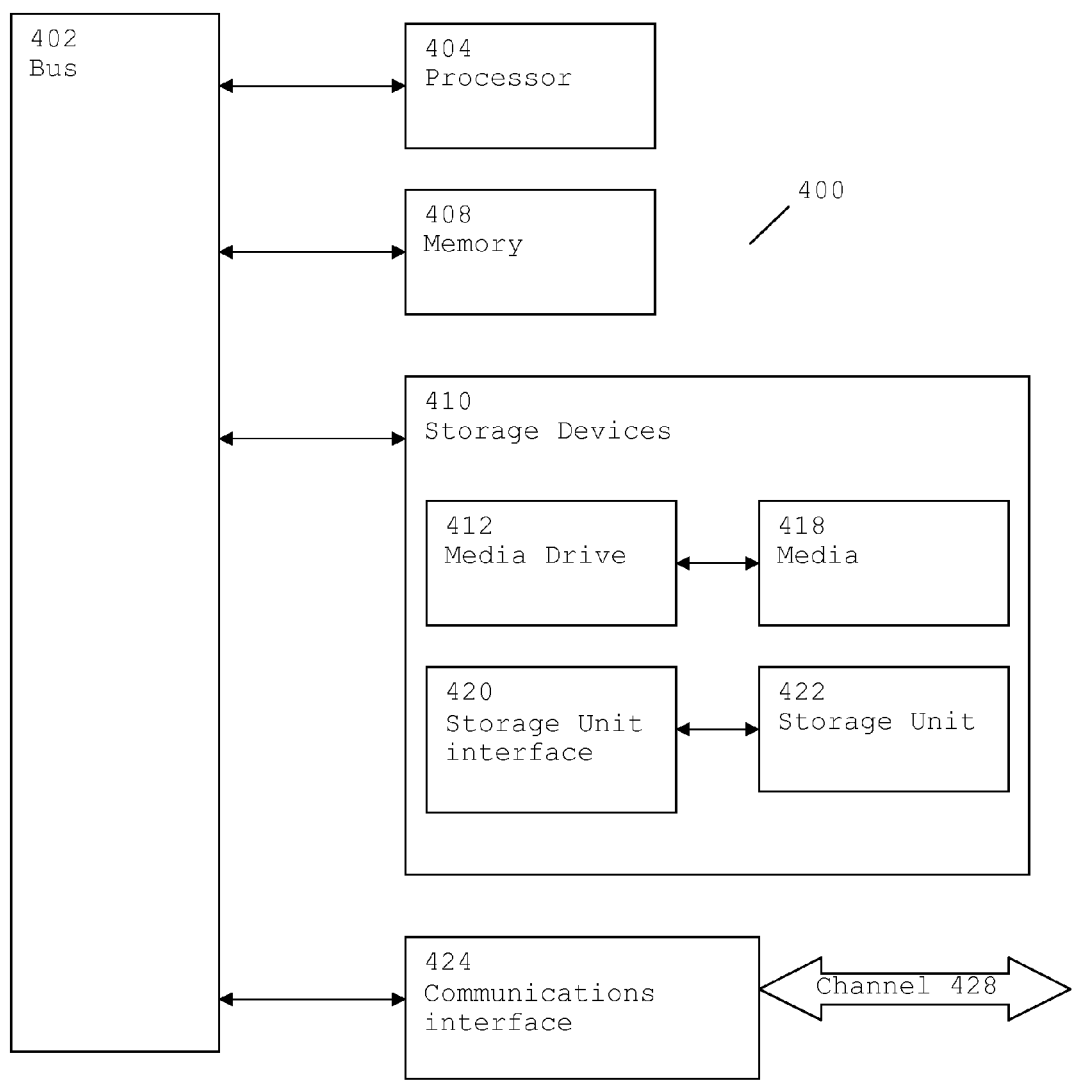
FIG. 4 illustrates a typical computing system that may be employed to implement signal processing functionality in example embodiments.

Referring now to FIG. 4, there is illustrated a typical computing system 400 that may be employed to implement signal processing functionality in embodiments of the invention.

Computing systems of this type may be used in access points, base transceiver stations and wireless communication units. Those skilled in the relevant art will also recognize how to implement the invention using other computer systems or architectures. Computing system 400 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 400 can include one or more processors, such as a processor 404. Processor 404 can be implemented using a general or special-purpose processing engine such as, for example, a microprocessor, microcontroller or other control module. In this example, processor 404 is connected to a bus 402 or other communications medium.

Computing system 400 can also include a main memory 408, such as random access memory (RAM) or other dynamic memory, for storing information and instructions to be executed by processor 404. Main memory 408 also may be used for storing temporary variables or other intermediate information during execution of instructions to be executed by processor 404. Computing system 400 may likewise include a read only memory (ROM) or other static storage device coupled to bus 402 for storing static information and instructions for processor 404.

The computing system 400 may also include information storage system 410, which may include, for example, a media drive 412 and a removable storage interface 420. The media drive 412 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 418 may include, for example, a hard disk, floppy disk, magnetic tape, optical disk, CD or DVD, or other fixed or removable medium that is read by and written to by media drive 412. As these examples illustrate, the storage media 418 may include a computer-readable storage medium having particular computer software or data stored therein.

In alternative embodiments, information storage system 410 may include other similar components for allowing computer programs or other instructions or data to be loaded into computing system 400. Such components may include, for example, a removable storage unit 422 and an interface 420, such as a program cartridge and cartridge interface, a removable memory (for example, a flash memory or other removable memory module) and memory slot, and other removable storage units 422 and interfaces 420 that allow software and data to be transferred from the removable storage unit 418 to computing system 400.

Computing system 400 can also include a communications interface 424. Communications interface 424 can be used to allow software and data to be transferred between computing system 400 and external devices. Examples of communications interface 424 can include a modem, a network interface (such as an Ethernet or other NIC card), a communications port (such as for example, a universal serial bus (USB) port), a PCMCIA slot and card, etc. Software and data transferred via communications interface 424 are in the form of signals which can be electronic, electromagnetic, and optical or other signals capable of being received by communications interface 424. These signals are provided to communications interface 424 via a channel 428. This channel 428 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 408, storage device 418, or storage unit 422. These and other forms of computer-readable media may store one or more instructions for use by processor 404, to cause the processor to perform specified operations. Such instructions, generally referred to as 'computer program code' (which may be grouped in the form of computer programs or other groupings), when executed, enable the computing system 400 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 400 using, for example, removable storage drive 422, drive 412 or communications interface 424. The control module (in this example, software instructions or executable computer program code), when executed by the processor 404, causes the processor 404 to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other subsystem element.

It will be appreciated that, for clarity purposes, the above description has described embodiments of the invention with reference to a single signal processing module. However, the inventive concept may equally be implemented by way of a plurality of different functional units and processors to provide the signal processing functionality. Accordingly, it will be understood that the term 'signal processing module' used herein is intended to encompass one or more signal processing functional units, circuits and/or processors. Thus, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved method and apparatus for redirecting wireless communication units have been described, wherein the aforementioned disadvantages with prior art arrangements have been substantially alleviated.

The invention claimed is:

1. A network element for supporting communication within at least one cell of a cellular communication network, wherein the network element comprises a signal processing circuit arranged to:
identify when a first cell supported by the network element is in a capacity state, and in response thereto indicate the first cell as being in a restricted access state within system information broadcast within the first cell, the system information being valid for wireless communication units in a connected mode state, and being invalid for wireless communication units which are in an idle state,
wherein the signal processing circuit is further arranged, upon receipt of a connection request message from a wireless communication unit within the first cell, to determine whether or not the first cell is in a capacity state and, in response to determining that the first cell is in a capacity state, to cause the wireless communication unit from which the connection request message was received to enter a connected mode state.

2. The network element of claim 1 wherein, upon identifying that the first cell is in a capacity state, the signal processing circuit is arranged to:
indicate the first cell as being in a restricted access state within a first system information block broadcast within the first cell and valid for wireless communication units in a connected mode state; and
indicate the first cell as not being in the restricted access state within a second system information block broadcast within the first cell and valid for wireless communication units in an idle state.

3. The network element of claim 1 wherein upon identifying that the first cell is in a capacity state, the signal processing circuit is arranged to set at least one from a group consisting of:
a "Cell Barred" information element within a system information block; and
a "Cell Reserved" information element within a system information block;
valid for wireless communication units in a connected mode state.

4. The network element of claim 1 wherein:
upon identifying that the first cell is in a capacity state, the signal processing circuit is arranged to indicate the first cell as being in a restricted access state within system information broadcast within the first cell and valid for wireless communication units in a "no dedicated channel" connected mode state; and
upon receipt of a connection request message from a wireless communication unit within the first cell, and if it is determined that the first cell is in a capacity state, the signal processing circuit is arranged to cause the wireless communication unit to enter a "no dedicated channel" connection state.

5. The network element of claim 4 wherein the network element is arranged to support communication within at least one cell of a Universal Mobile Telecommunications System (UMTS™) network, and:
upon identifying that a first cell supported by the network element is in a capacity state, the signal processing circuit is arranged to indicate the first cell as being in a restricted access state within system information broadcast within the first cell and valid for wireless communication units in a Cell_FACH state; and
upon receipt of a connection request message from a wireless communication unit within the first cell, and if it is determined that the first cell is in a capacity state, the signal processing circuit is arranged to cause the wireless communication unit to enter a Cell_FACH state.

6. The network element of claim 5 wherein, upon identifying that the first cell supported by the network element is in a capacity state, the signal processing circuit is arranged to set at least one from a group consisting of:
a "Cell Barred" information element within a system information block type 4 (SIB4) broadcast within the first cell; and
a "Cell Reserved" information element within a system information block type 4 (SIB4) broadcast within the first cell.

7. The network element of claim 1 wherein, upon receipt of a connection request message from a wireless communication unit within the first cell, and if it is determined that the first cell is in a capacity state, the signal processing circuit is arranged to send a connection setup message to the wireless communication unit from which the connection request message was received, the connection setup message being arranged to cause the wireless communication unit to enter a connected mode state where the wireless communication unit recognises the restricted access state of the first cell and selects another cell.

8. The network element of claim 1 wherein, upon receipt of a connection request message from a wireless communication unit within the first cell, and if it is determined that the first cell is in a capacity state, the signal processing circuit is arranged to determine a type of redirection to use from the group consisting of:
intra-frequency redirection;
inter-frequency redirection; and
inter-RAT (Radio Access Technology) redirection; and
wherein if the signal processing circuit determines that intra-frequency redirection is to be used, the signal processing circuit is arranged to cause the wireless communication unit to enter a connected mode state.

9. A cellular communication system comprising at least one network element for supporting communication within at least one cell of the communication system, wherein the network element comprises a signal processing circuit arranged to:

identify when a first cell supported by the network element is in a capacity state, and in response thereto indicate the first cell as being in a restricted access state within system information broadcast within the first cell, the system information being valid for wireless communication units in a connected mode state, and being invalid for wireless communication units in an idle state;

wherein the signal processing circuit is further arranged, upon receipt of a connection request message from a wireless communication unit within the first cell to determine whether the first cell is in a capacity state, and in response to determining that the first cell is in a capacity state, to cause the wireless communication unit from which the connection request message was received to enter a connected mode state.

10. A method for redirecting a wireless communication unit within a cellular communication network, the method comprising, at a network element:

identifying when a first cell supported by the network element is in a capacity state, and in response thereto, indicating the first cell as being in a restricted access state within system information broadcast within the first cell; the system information being valid for wireless communication units in a connected mode state and being invalid for wireless communication units in an idle state;

wherein the method further comprises, upon receipt of a connection request message from a wireless communication unit within the first cell determining whether or not the first cell is in a capacity state and in response to determining that the first cell is in a capacity state, causing the wireless communication unit from which the connection request message was received to enter a connected mode state.

11. The network element of claim 1 comprising a non-transitory computer readable medium having computer-readable instructions stored therein for redirecting a wireless communication unit within a cellular communication network, the computer readable instructions operable for:

identifying when a first cell supported by the network element is in a capacity state, and in response thereto, indicating the first cell as being in a restricted access state within system information broadcast within the first cell, the system information being valid for wireless communication units in a connected mode state, and invalid for wireless communication units in an idle state;

the computer-readable instructions further operable for, upon receipt of a connection request message from a wireless communication unit within the first cell supported by the network element:

determining whether the first cell is in a capacity state, and in response to determining that the first cell is in a capacity state, causing the wireless communication unit from which the connection request message was received to enter a connected mode state.

12. The network element of claim 11 wherein the non-transitory computer readable medium comprises at least one from a group consisting of: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

* * * * *

UNITED STATES PATENT AND TRADEMARK OFFICE
CERTIFICATE OF CORRECTION

| | | |
|---|---|---|
| PATENT NO. | : 8,971,910 B2 | Page 1 of 1 |
| APPLICATION NO. | : 13/703595 | |
| DATED | : March 3, 2015 | |
| INVENTOR(S) | : Michael Eric Morrin | |

It is certified that error appears in the above-identified patent and that said Letters Patent is hereby corrected as shown below:

TITLE PAGE:

Item (75) Inventor: Change "Hertfordsire" to -- Hertfordshire --.

Signed and Sealed this
Twenty-second Day of December, 2015

Michelle K. Lee
*Director of the United States Patent and Trademark Office*